United States Patent
Kuwahara et al.

(10) Patent No.: US 6,303,227 B1
(45) Date of Patent: Oct. 16, 2001

(54) LUBRICANT COMPOSITION MAGNETIC RECORDING MEDIUM, AND PROCESS FOR PRODUCING MAGNETIC RECORDING MEDIUM

(75) Inventors: Kenji Kuwahara, Ikoma; Yukikazu Ohchi, Moriguchi; Tetuo Fuchi, Osaka; Mikio Murai, Kyotanabe, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/462,780
(22) PCT Filed: Jul. 13, 1998
(86) PCT No.: PCT/JP98/03124
§ 371 Date: Jan. 14, 2000
§ 102(e) Date: Jan. 14, 2000
(87) PCT Pub. No.: WO99/03954
PCT Pub. Date: Jan. 28, 1999

(30) Foreign Application Priority Data

Jul. 16, 1997 (JP) .................................................. 9/191185
Jun. 15, 1998 (JP) ................................................ 10/166741

(51) Int. Cl.$^7$ .................................................. G11B 5/725
(52) U.S. Cl. .................. 428/421; 428/422; 428/694 TC; 428/694 TF; 428/900; 508/421; 508/459; 508/496; 508/564; 508/582
(58) Field of Search .................... 428/421, 422, 428/694 TC, 694 TF, 900; 508/421, 459, 496, 564, 582

(56) References Cited

U.S. PATENT DOCUMENTS

| | | | |
|---|---|---|---|
| 4,647,507 | 3/1987 | Suzuki et al. | 428/421 |
| 5,137,784 | 8/1992 | Suzuki et al. | 428/408 |
| 5,540,957 | 7/1996 | Ueda et al. | 427/535 |
| 5,545,478 | 8/1996 | Lin et al. | 428/332 |
| 5,631,081 | 5/1997 | Lin et al. | 428/332 |
| 5,637,393 | 6/1997 | Ueda et al. | 428/332 |
| 5,677,051 | 10/1997 | Ueda et al. | 428/336 |
| 5,707,742 | 1/1998 | Usuki et al. | 428/422 |

FOREIGN PATENT DOCUMENTS

| | | |
|---|---|---|
| 0 497 536 | 8/1992 | (EP) . |
| 56-47926 | 4/1981 | (JP) . |
| 61-107529 | 5/1985 | (JP) . |
| 62-46431 | 2/1987 | (JP) . |
| 63-263626 | 10/1988 | (JP) . |
| 2-126417 | 5/1990 | (JP) . |
| 2-265017 | 10/1990 | (JP) . |
| 4-270243 | 9/1992 | (JP) . |
| 5-40932 | 2/1993 | (JP) . |
| 5-140569 | 6/1993 | (JP) . |
| 7-62905 | 7/1995 | (JP) . |
| 9-120526 | 5/1997 | (JP) . |

Primary Examiner—Stevan A. Resan
(74) Attorney, Agent, or Firm—Wenderoth, Lind & Ponack, L.L.P.

(57) ABSTRACT

A lubricant composition having excellent lubricity and comprising at least one compound selected among fluorine compounds each having a perfluoroalkyl or perfluoroether group and an alkyl or alkenyl group in the molecule and at least one compound selected among fluorine compounds each having a perfluoropolyether group in the molecule; and a magnetic recording medium excellent in running durability and still durability and comprising a nonmagnetic substrate (1) and, formed thereon in this order, a ferromagnetic thin metal film (2), a carbon film (3), and a lubricant layer (4), wherein the lubricant layer (4) contains the lubricant composition.

9 Claims, 1 Drawing Sheet

Fig. 1

LUBRICANT COMPOSITION MAGNETIC RECORDING MEDIUM, AND PROCESS FOR PRODUCING MAGNETIC RECORDING MEDIUM

TECHNICAL FIELD

The present invention relates to: a lubricant composition exhibiting an excellent lubricity; a magnetic recording medium having a ferromagnetic metal thin film as a magnetic recording layer, a carbon film thereon, and further a lubricant layer thereon, which is most suitable, for example, for a digital video tape recorder and a highly fine video tape recorder; and a method for producing the same.

BACKGROUND ART

In recent years, in the field of magnetic recording, with the improvement in performance of recording and reproducing equipment such as digitalization, scale reduction, and elongation of time for use, development of a highly dense magnetic recording medium suitable therefor is actively taking place. Recently, a metal thin film type magnetic recording medium, which is extremely advantageous for a short wave length recording, is put into practical use in lieu of an application type magnetic recording medium.

However, since a magnetic layer of a metal thin film type magnetic recording medium has an extremely good surface property, i.e. a small roughness on the surface, it contacts with a magnetic head in broader area, and, as the result, it is liable to be abraded by receiving a great friction force while being in a rapid sliding movement with the magnetic head during a process of recording/reproducing signals. Abrasion of the magnetic layer greatly affects the running durability, the still durability, or the like, so that reduction of the abrasion of the magnetic layer is a great object in the research and development of a metal thin film type magnetic recording medium.

Therefore, an attempt is made to reduce the abrasion by disposing a lubricant layer on a magnetic layer surface to improve the running durability and the still durability. In the case where the lubricant layer is disposed, the lubricant layer on the magnetic layer surface is requested to exhibit a lubricating property with a thickness as small as several nanometers in order to prevent the output reduction caused by a spacing loss between the magnetic recording medium and the magnetic head as much as possible for achieving a high output. Accordingly, use of a fluorine-based compound exhibiting an excellent lubricating property is widely studied and use of various compounds is proposed.

For example, use of a fluorine-containing long chain carboxylic acid ester (See Japanese Laid-open Patent Publication No. 62-46431/1987) represented by the following chemical formula (X):

$$C_{18}H_{35}OCOC_9F_{17} \tag{X}$$

or a fluorine-containing carboxylic acid monoester having a carboxyl group (See Japanese Laid-open Patent Publication No. 61-107529/1986) represented by the following chemical formula (Y):

(Y)

or the like, is proposed.

However, the request concerning the improvement of the performance of the magnetic recording medium is demanding, and it is difficult to obtain a sufficient lubricity with the aforementioned conventional lubricants, so that a further improvement of the running durability and the still durability for the magnetic recording medium is desired.

DISCLOSURE OF THE INVENTION

In view of the aforementioned problems, the present invention provides a lubricant composition that makes it possible to obtain a magnetic recording medium which is excellent in running durability and still durability and has a high practical reliability without deteriorating the electromagnetic conversion characteristics. Further, the present invention provides a magnetic recording medium using the lubricant composition, and a production method thereof.

A lubricant composition of the present invention, which is the first invention, comprises two or more kinds of specific fluorine-containing compounds as described later. For example, if this lubricant composition is comprised in the lubricant layer of a magnetic recording medium, it allows the magnetic recording medium to exhibit an excellent running durability and an excellent still durability without deteriorating its electromagnetic conversion characteristics, since the adhesion strength of the lubricating layer to a carbon film located thereunder is improved and an excellent lubricating property is imparted to the magnetic recording medium. The present specification discloses various lubricant compositions which provide these effects.

The first lubricant composition of the present invention is characterized by comprising:

at least one compound compounds having a perfluoroalkyl group or a perfluoropolyether group, and an alkyl group or an alkenyl group in a molecule, which compound is selected from a group of consisting of compounds represented by the following general formulae (a) and (b):

(a)

wherein $R_1$ is an alkyl group or an alkenyl group, $R_2$ is a perfluoroalkyl group or a perfluoropolyether group, "a" is an integer of 0 to 20, and "b" is 0 or 1; and (b)

wherein $R_3$ is an alkyl group or an alkenyl group, $R_4$ is a perfluoroalkyl group or a perfluoropolyether group, $R_5$ is O or S, "c" is an integer of 0 to 20, and "d" is 0 or 1; and at least one compound having a perfluoropolyether group in a molecule, which compound is selected from a group consisting of compounds represented by the following general formulae (c), (d), and (e):

$$HOCH_2CF_2(OC_2F_4)_e(OCF_2)_gOCF_2CH_2OH \quad (c)$$

wherein "e" and "g" each are integers of not less than 1;

$$HOOCCF_2(OC_2F_4)_i(OCF_2)_jOCF_2COOH \quad (d)$$

wherein "i" and "j" each are integers of not less than 1; and $$R_6COOCH_2\,CF_2(OC_2F_4)_k(OCF_2)_pOCF_2CH_2OCOR_6 \quad (e)$$

wherein "k" and "p" each are integers of not less than 1, and $R_6$ is an alkyl group having 4 to 22 carbon atoms.

Each of the compounds represented by the general formulae (a) to (e) is a fluorine-containing compound. This lubricant composition comprises at least one compound selected from a group consisting of fluorine-containing monocarboxylic acids represented by the general formulae (a) and (b), and at least one compound selected from a group consisting of fluorine-containing diols represented by the general formula (c), fluorine-containing dicarboxylic acids represented by the general formula (d), and fluorine-containing diesters represented by the general formula (e). Here, the compounds represented by the general formula (a) may also be referred to as fluorine-containing carboxylic acid monoesters having one carboxyl group.

If this composition is comprised in a lubricant layer of a magnetic recording medium having a ferromagnetic metal thin film, a carbon film, and a lubricant layer formed in this order on a non-magnetic substrate (hereinafter such a magnetic recording medium may be simply referred to as a metal thin film type magnetic recording medium), the adhesion strength of the lubricant layer to the carbon film is improved, and an excellent lubricity is imparted to the magnetic recording medium. Further, a synergistic effect of these makes it possible to obtain a magnetic recording medium having a high practical reliability with improved running durability and still durability without deteriorating the electromagnetic conversion characteristics.

The second lubricant composition of the present invention is characterized by comprising at least one compound selected from compounds represented by the aforementioned general formula (a) and at least one compound selected from compounds represented by the aforementioned general formula (b).

This lubricant composition comprises at least one fluorine-containing monocarboxylic acid (or a fluorine-containing carboxylic acid monoester having one carboxyl group) represented by the general formula (a), and at least one fluorine-containing monocarboxylic acid represented by the general formula (b). This composition also provides an effect similar to that of the aforementioned first lubricant composition.

The third lubricant composition of the present invention is characterized by comprising at least one compound selected from compounds represented by the aforementioned general formula (a) wherein $R_2$ is a perfluoroalkyl group, and at least one compound selected from compounds represented by the aforementioned general formula (a) wherein $R_2$ is a perfluoropolyether group.

This lubricant composition comprises at least one compound represented by the general formula (a) wherein $R_2$ is a perfluoroalkyl group, and at least one compound represented by the general formula (a) wherein $R_2$ is a perfluoropolyether group. This composition also provides an effect similar to that of the aforementioned first and second lubricant compositions.

These lubricant compositions are each useful as a material for constituting a lubricant layer for a magnetic recording medium.

A magnetic recording medium of the present invention, which is the second invention, is a magnetic recording medium having a ferromagnetic metal thin film, a carbon film, and a lubricant layer formed in this order on a non-magnetic substrate, and being characterized in that the lubricant layer comprises at least one of the aforementioned lubricant compositions. Use of a lubricant composition obtained by combining two or more kinds of the aforementioned specific fluorine-containing compounds improves the adhesion strength of the lubricant layer to the carbon film located thereunder and imparts an excellent lubricity to the magnetic recording medium. Further, a synergistic effect of these makes it possible to obtain a magnetic recording medium having a high practical reliability with improved running durability and still durability without deteriorating the electromagnetic conversion characteristics.

The third invention relates to a method for producing the aforementioned magnetic recording medium of the present invention. In the method, it is possible to adopt a process which is conventionally used for the production of a magnetic recording medium except for the step of forming the lubricant layer, and the step is characterized by including the step of applying an application solution, which is prepared by dissolving the above-described lubricant composition into a mixed organic solvent of a hydrocarbon-based solvent and an alcohol-based solvent, on the carbon film and drying the mixed solvent. Use of the mixed organic solvent of the hydrocarbon-based solvent and the alcohol-based solvent can form a uniform thin lubricant layer with improved adhesion strength between the lubricant layer and the carbon film, and with an extremely small amount of application unevenness. Thus, the production method of the present invention makes it possible to obtain a magnetic recording medium having an excellent lubricity and a high practical reliability.

BRIEF DESCRIPTION OF THE DRAWINGS

Here, in FIG. 1, the reference numbers represent the following elements.

1 . . . non-magnetic substrate, 2 . . . ferromagnetic metal thin film, 3 . . . carbon film, 4 . . . lubricant layer, 5 . . . backcoat layer.

EMBODIMENTS OF THE INVENTION

Fluorine-containing compounds comprised in the lubricant compositions of the present invention are compounds represented by the aforementioned general formulae (a) to (e).

The compounds represented by the following general formula (a):

(a)

may be referred to as fluorine-containing carboxylic acid monoesters having one carboxyl group. The compounds are obtained by esterifying one of two carboxyl groups in a dicarboxylic acid such as succinic acid.

In the general formula (a), $R_1$ is an alkyl group or an alkenyl group, $R_2$ is a perfluoroalkyl group or a perfluoropolyether group, "a" is typically an integer of 0 to 20, preferably an integer of 1 to 1, and "b" is 0 or 1. $R_1$ in the general formula (a) preferably has 6 to 30 carbon atoms, more preferably 10 to 24 carbon atoms. If the carbon number is less than 6 or exceeds 30, the lubricity may decrease.

If $R_2$ is a perfluoroalkyl group, its carbon number is preferably 1 to 12. If $R_2$ is a perfluoropolyether group, its molecular weight is preferably about 200 to about 6000, more preferably about 300 to 4000. If the molecular weight is less than 200 or exceeds 6000, the lubricity and the preservation reliability may decrease.

If $R_2$ is a perfluoropolyether group, the perfluoropolyether group is preferably a group represented by one of the following general formulae (f), (g), and (h):

(f)

(g)

$R_7(OC_uF_{2u})_vO(CF_2)_{u-1}-$ (h)

Here, "q" in the general formula (f) is an integer of not less than 1, and "r" and "t" in the general formula (g) are each an integer of not less than 1. $R_7$ in the general formula (h) is a perfluoroalkyl group, "u" is typically an integer of 1 to 6, and "v" is typically an integer of 1 to 30, more preferably 1 to 8. If "q", "r", "t", "u", or "v" is out of the range, the lubricity and the preservation reliability of the magnetic recording medium may decrease.

If a lubricant layer of a metal thin film type magnetic recording medium comprises the lubricant composition which comprises the compound having the aforementioned perfluoropolyether group, the adhesion strength of the lubricating layer to the carbon film is further improved, and a more excellent lubricating property is imparted to the magnetic recording medium. Further, a synergistic effect of these makes it possible to obtain a magnetic recording medium having a high practical reliability with improved running durability and still durability without deteriorating the electromagnetic conversion characteristics.

The compounds represented by the following general formula (b):

(b)

are fluorine-containing compounds having one carboxyl group. In the general formula (b), $R_3$ is an alkyl group or an alkenyl group, $R_4$ is a perfluoroalkyl group or a perfluoropolyether group, $R_5$ is oxygen atom or sulfur atom, "c" is typically an integer of 0 to 20, preferably an integer of 1 to 10, and "d" is 0 or 1. $R_3$ in the general formula (b) preferably has 6 to 30 carbon atoms, more preferably 10 to 24 carbon atoms. If the carbon number is less than 6 or exceeds 30, the lubricity may decrease.

If $R_4$ in the general formula (b) is a perfluoroalkyl group, its carbon number is preferably 1 to 12. If $R_4$ is a perfluoropolyether group, its molecular weight is preferably about 200 to about 6000, more preferably about 300 to about 4000. If the molecular weight is less than 200 or exceeds 6000, the lubricity and the preservation reliability may decrease. If $R_4$ is a perfluoropolyether group, $R_4$ is preferably a group selected from the groups represented by the aforementioned general formulae (f), (g), and (h), in the same manner as $R_2$ in the general formula (a). The general formulae (f), (g), and (h) are the same as previously explained in connection with the general formula (a), and a detailed explanation thereof will be omitted here by referring to the previous explanation.

Here, "e" and "g" in the general formula (c), "i" and "j" in the general formula (d), and "k" and "p" in the general formula (e):

$HOCH_2CF_2(OC_2F_4)_e(OCF_2)_gOCF_2CH_2OH$ (c)

$HOOCCF_2(OC_2F_4)_i(OCF_2)_jOCF_2COOH$ (d)

$R_6COOCH_2CF_2(OC_2F_4)_k(OCF_2)_pOCF_2CH_2OCOR_6$ (e)

are each an integer of not less than 1.

The molecular weight of a perfluoropolyether chain in one molecule of each of the compounds represented by the general formulae (c), (d), and (e) is preferably about 200 to about 6000, more preferably about 300 to about 4000. If the molecular weight is less than 200 or exceeds 6000, the lubricity and the preservation reliability may decrease. Further, the carbon number of $R_6$ in the general formula (e) is preferably 4 to 22, more preferably 12 to 22.

The first lubricant composition of the present invention is a mixture of at least one compound selected from a group consisting of the compounds represented by the aforementioned general formulae (a) and (b), and at least one compound selected from a group consisting of the aforementioned general formulae (c), (d) and (e). In this composition, the mixing molar ratio of the former to the latter is preferably within the range of 8:2 to 2:8, more preferably within the range of 7:3 to 4:6.

The second lubricant composition of the present invention is a mixture of at least one compound selected from the compounds represented by the general formula (a) and at least one compound selected from the compounds represented by the general formula (b). The mixing molar ratio of the compound selected from the compounds represented by the general formula (a) to the compound selected from the compounds represented by the general formula (b) is preferably within the range of 8:2 to 2:8, more preferably within the range of 7:3 to 4:6.

The third lubricant composition of the present invention is a mixture of at least one compound selected from the compounds represented by the general formula (a) wherein $R_2$ is a perfluoroalkyl group, and at least one compound selected from the compounds represented by the general formula (a) wherein $R_2$ is a perfluoropolyether group. In this composition, the mixing molar ratio of the former to the latter is preferably within the range of 8:2 to 2:8, more preferably within the range of 7:3 to 4:6.

The aforementioned lubricant compositions each may further comprises an organic phosphorus-based compound. The organic phosphorus-based compound acts as a corrosion inhibitor and/or an extreme-pressure agent and, in the case where it is comprised in a lubricant layer of a metal thin film type magnetic recording medium, it serves also to improve the adhesion strength between the lubricant layer and the carbon film, thereby further improving the lubricating property, the running durability and still durability of the magnetic recording medium and, as a result, further improving the practical reliability of the magnetic recording medium.

Specifically, it is preferable to use at least one organic phosphorus-based compound selected from a group consisting of compounds represented by the following general formulae (i), (j), (k), (l), (m), (n), (o), (p), and (q):

$$HP(O)(OC_nH_{2n+1})_2 \quad (i)$$

$$P(OC_nH_{2n+1})_3 \quad (j)$$

$$P(SC_nH_{2n+1})_3 \quad (k)$$

$$O=P(OC_nH_{2n+1})_3 \quad (l)$$

$$S=P(OC_nH_{2n+1})_3 \quad (m)$$

$$O=P(SC_nH_{2n+1})_3 \quad (n)$$

$$S=P(SC_nH_{2n+1})_3 \quad (o)$$

$$(C_nH_{2n+1}O)_2P(O)OH \quad (p)$$

$$(C_nH_{2n+1}O)P(O)(OH)_2 \quad (q)$$

If a lubricant composition comprising at least one of these specific organic phosphorus-based compounds is used, for example, in a lubricant layer of a metal thin film type recording medium, the practical reliability of the magnetic recording medium is further improved.

In the above-mentioned general formulae (i) to (q), the number (n) of carbon atoms constituting each compound is preferably 8 to 20. If the number of carbon atoms is 7 or less, the lubricity decreases, whereas if it exceeds 21, the solubility into a general-purpose solvent such as a hydrocarbon-based solvent or an alcohol-based solvent decreases. Low solubility into a general-purpose solvent raises a problem that, if a lubricant layer of a metal thin film type magnetic recording medium is formed, for example, according to the method of the present invention, the production of the magnetic recording medium is hindered.

The mixing molar ratio of the total amount of the lubricant composition excluding the organic phosphorus-based compound to the organic phosphorus-based compound is preferably within the range of 1:1 to 1:0.01, more preferably within the range of 1:0.3 to 1:0.02. If the mixing ratio of the organic phosphorus-based compound is too large, the lubricating property is deteriorated, whereas if it is too small, it is not possible to sufficiently obtain an action and effect provided by the organic phosphorus compound. Here, the "total amount of the lubricant composition excluding the organic phosphorus-based compound" refers to the total amount of the compounds comprised in the lubricant composition which are represented by the aforementioned general formulae (a) to (e) and. If other component(s) is contained in the composition, its amount is excluded from the total amount. For example, if the second lubricant composition of the present invention is a three-component system composition comprising an organic phosphorus-based compound, the total amount of the lubricant composition excluding the organic phosphorus-based compound is a combined amount of the compound represented by the general formula (a) and the compound represented by the general formula (b). Further, if this lubricant composition comprises a fourth component other than the compounds represented by the general formulae (a) to (e), the total amount of the lubricant composition excluding the organic phosphorus-based compound does not include the fourth component, and only the combined amount of the compound represented by the general formula (a) and the compound represented by the general formula (b) is the total amount of the lubricant composition excluding the organic phosphorus-based compound.

Figure 1:
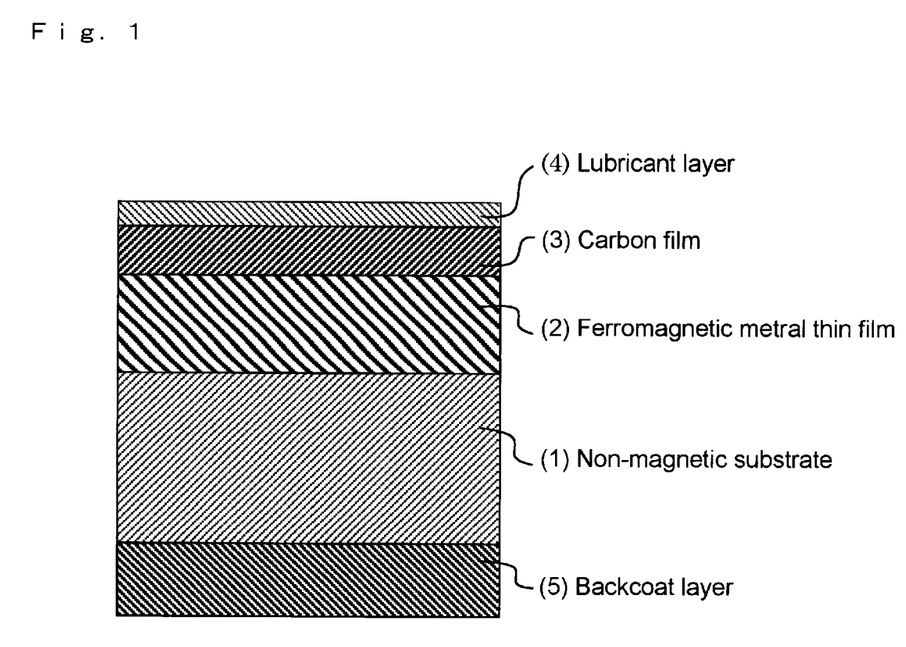
FIG. 1 is a schematic view illustrating a cross section of a metal thin film type magnetic tape to which a magnetic recording medium according to an embodiment of the present invention is applied.

The magnetic recording medium of the present invention is a magnetic recording medium having a ferromagnetic metal thin film, a carbon film, and a lubricant layer formed in this order on a non-magnetic substrate, wherein the lubricant layer comprises at least one of the aforementioned lubricant compositions. Each layer constituting the magnetic recording medium of the present invention will be hereafter explained, together with its production method, by referring to the drawings.

FIG. 1 is a cross section view of a metal thin film type magnetic tape (hereinafter simply referred to as a magnetic tape) as an embodiment of a magnetic recording medium of the present invention. This magnetic tape has a construction such that a backcoat layer (5), a non-magnetic substrate (1), a ferromagnetic metal thin film (2), a carbon film (3), and a lubricant layer (4) are laminated in this order from the bottom.

As previously described, the layers other than the lubricant layer and the method of forming the same are known in the art, and conventional materials and formation methods can be adopted.

For example, as the non-magnetic substrate (1), a film made of polyethylene terephthalate, polyethylene naphthalate, aromatic polyamide, or aromatic polyimide, an aluminum substrate, a glass substrate, or the like can be used. In view of compatibility between practical reliability and good RF output, it is preferable that a process of forming protrusions of 10 nm to 30 nm is performed on a top surface of the non-magnetic substrate (1), i.e. on the surface which is in contact with the ferromagnetic metal thin film.

The ferromagnetic metal thin film (2) can be formed by the ion plating method, the sputtering method, the electron beam vapor deposition method, or the like. As a material for thin film, Co—Ni, Co—Ni—O, Co, Co—O, Co—Cr, or the like is suitably chosen. The ferromagnetic metal thin film (2) typically has a thickness of 50 nm to 300 nm.

The carbon film (3) has a high Vickers hardness of about 2500 kg/mm$^2$, and prevents damages to the magnetic tape together with the lubricant layer (4). In consideration of the balance between practical reliability and output, the thickness thereof is preferably 10 nm to 20 nm. The carbon film (3) is formed by the plasma CVD method using a hydrocarbon gas alone or a mixed gas of a hydrocarbon gas and an inert gas. Specifically, a hydrocarbon gas or a mixed gas of a hydrocarbon gas and an inert gas such as argon is introduced into a vacuum container, and electric discharge is generated in the inside of the vacuum container while maintaining the pressure in the container to be 0.001 to 1 Torr, thereby to generate plasma of the hydrocarbon gas to form the carbon film (3) on the ferromagnetic metal thin film (2). The electric discharge may be generated by using either of the external electrode system and the internal electrode system. The electric discharge frequency can be experimentally determined. Further, by applying a voltage of 0 KV to −3 KV to an electrode disposed on the non-magnetic substrate (1) side, the hardness of the carbon film (3) can be increased and the close adhesion between the carbon film (3) and the ferromagnetic metal thin film (2) can be improved. Methane, ethane, propane, butane, pentane, hexane, heptane, octane, benzene, or the like, for example, can be used as the hydrocarbon gas.

Here, in order to form the hard carbon film (3), it is desirable to increase the electric discharge energy and also it is desirable to maintain the temperature of the non-magnetic substrate (1) to be high. For example, it is desirable that the electric discharge energy has an effective value of not less than 600V by superposing an AC current such as a high frequency current and a DC current.

In the present invention, it is desirable that the carbon film (3) has a nitrogen-containing plasma polymerized film (not illustrated) on a top surface portion thereof and the lubricant layer (4) is formed on the nitrogen-containing plasma polymerized film of the carbon film. The nitrogen-containing plasma polymerized film is formed, for example, by introducing a gasified amine compound such as propylamine, butylamine, ethylenediamine, propylenediamine or tetramethylenediamine into a vacuum container and generating a high frequency electric discharge in the vacuum container while maintaining the pressure within the container to be 0.001 to 1 Torr. A suitable thickness of the nitrogen-containing plasma polymerized film is less than 3 nm. If the nitrogen-containing plasma polymerized film has a larger thickness than this, the carbon film decreases its protective effect.

By nitrogen-containing plasma polymerization, i.e. by forming a nitrogen-containing plasma polymerized film on a carbon film, an amino group is present on a top surface portion of the carbon film, whereby the adhesion strength between the lubricant layer and the carbon film further increases and the durability of the magnetic recording medium is further improved. In addition to this, since the lubricant layer comprises specific fluorine-containing compounds, it is possible to obtain a magnetic recording medium having a high practical reliability and an excellent lubricating property with improved running durability and still durability without deteriorating the electromagnetic conversion characteristics.

Here, the method of forming a nitrogen-containing plasma polymerized film on a top surface portion of the carbon film is disclosed in U.S. Pat. Nos. 5,540,957 and 5,637,393, the disclosures of which are incorporated herein by reference.

The lubricant composition constituting the lubricant layer (4) is as described before. The step of forming the lubricant layer (4) includes the steps of preparing an application solution by dissolving a lubricant composition obtained by suitably mixing the compounds represented by the aforementioned general formulae (a) to (e) and optionally an organic phosphorus-based compound and/or other components, into a mixed organic solvent of a hydrocarbon-based solvent and an alcohol-based solvent, and applying the application solution onto the carbon film (3)

The hydrocarbon-based solvent that can be used in the present invention is, for example, toluene, hexane, heptane, octane, or the like, and the alcohol-based solvent that can be used in the present invention is, for example, a lower alcohol such as methyl alcohol, ethyl alcohol, propyl alcohol, or isopropyl alcohol, or the like. If the ratio of the alcohol-based solvent is too large, unevenness of application is liable to be generated, whereas if the ratio of the hydrocarbon-based solvent is too large, it is uneconomical. Accordingly, the two are mixed for use preferably within a mixing ratio range of 1:9 to 9:1, more preferably 3:7 to 7:3 by weight. Mixing the two within this range makes it possible to reduce the unevenness of application to the minimum and also it is advantageous in terms of costs.

The concentration of the application solution and the application thickness are adjusted so that the lubricant layer (4) formed on the carbon film (3) after evaporation of the solvent may have a desired thickness. Typically, it is preferable that an application solution having a lubricant composition concentration of 100 ppm to 4000 ppm is applied to have a thickness of 1 $\mu$m to 50 $\mu$m.

The most suitable thickness of the lubricant layer (4) depends on the lubricant composition. The thickness thereof is typically 3 to 5 nm.

The method of applying the application solution may be any of wet application methods such as the bar coating method, the gravure coating method, the reverse roll coating method, the die coating method, the dipping method, or the spin-coating method, or the vacuum vapor deposition method.

After the application solution is applied, a drying process is carried out to evaporate the mixed organic solvent, whereby a lubricant composition layer (4) is formed on the carbon film (3). The drying process can be performed either by heating or by natural drying.

By using this mixed organic solvent, it is possible to obtain a lubricant layer having a uniform thickness without application unevenness, and also it is possible to form a lubricant layer having an extremely small thickness of several nanometers after the solvent is finally evaporated. As a result, a magnetic recording medium having an excellent lubricating property and a high practical reliability is obtained.

The back coat layer (5) is a layer formed of one or more materials selected from polyurethane, nitrocellulose, polyester, carbon, calcium carbonate, and the like, and the thickness thereof is preferably about 500 nm.

EXAMPLES

Hereafter, concrete embodiments of the present invention will be explained, but it goes without saying that the present invention is not limited by these embodiments.

Example 1

As a non-magnetic substrate (1), a polyethylene terephthalate film which had a width of 500 mm and a thickness of 6.3 $\mu$m and on which $10^5$ to $10^9$ protrusions each having a height of 30 nm and a diameter of 200 nm were formed per 1 mm$^2$ was used. Here, the number of protrusions was measured by the STM analysis. A ferromagnetic metal thin film (2) made of Co(80)—Ni(20) (numerals in the parentheses are mixing molar ratios) and having a thickness of 180 nm was formed on a top surface of the non-magnetic substrate (1) by the obliquely vacuum vapor deposition method while introducing oxygen.

Next, a methyl ethyl ketone/toluene/cyclohexanone solution containing 30% of solid components composed of polyurethane, nitrocellulose and carbon black, was applied on a back surface of the non-magnetic substrate (1) by a reverse roll coater to form a back coat layer (5) having a thickness of about 500 nm after drying.

Subsequently, a carbon film (3) having a thickness of 15 nm was formed on the ferromagnetic metal thin film (2) by the plasma CVD method. The carbon film was formed by introducing a gas obtained by mixing a hexane gas and an argon gas at a ratio of 4:1 (pressure ratio) into a vacuum container, and applying an electric current obtained by superposing an AC current having a frequency of 20 KHz and a voltage of 1500 V on a DC current of 1000 V, to an electrode in an electric discharge tube while maintaining the total gas pressure to be 0.3 Torr. Further, a propylamine gas was introduced on the carbon film (3) and a high frequency plasma process of 10 KHz was performed while maintaining a pressure of 0.05 Torr, to form a nitrogen-containing plasma polymerized film having a thickness of 2.5 nm on a top surface portion of the carbon film (3).

Then, a lubricant composition obtained by mixing the compound represented by the chemical formula (a1) and the compound represented by the chemical formula (c1) (Fomblin-Z-DOL™, Ausimont) at a molar ratio of 1:1 was dissolved into a mixed organic solvent obtained by mixing isopropyl alcohol and toluene at a weight ratio of 1:1 so that the concentration thereof would be 2000 ppm, thereby to prepare an application solution. Then, this application solution was applied by the wet application method using a reverse roll coater. In the end, a lubricant layer (4) having a thickness of 4 nm was formed on the carbon film (3).

(a1)

$$HOCH_2CF_2(OC_2F_4)_6OCF_2OCF_2CH_2OH \quad (c1)$$

A tape material produced as shown above was cut by a slitter into an 8 mm width to obtain a magnetic tape sample having a width of 8 mm (total thickness: 7 μm, 60-minute length).

Examples 2 to 6

Magnetic tape samples were each produced in the same manner as in Example 1 except that each lubricant composition obtained by mixing one of the compounds represented by the chemical formula (a2) to the chemical formula (a6) (corresponding to Examples 2 to 6) and the compound represented by the chemical formula (c1) in a molar ratio of 1:1 was used in each Example.

Examples 7 to 11

Magnetic tape samples each were produced in the same manner as in Example 1 except that each lubricant composition obtained by mixing one of the compounds represented by the chemical formula (b1) to the chemical formula (b5) (corresponding to Examples 7 to 11) and the compound represented by the chemical formula (c1) at a molar ratio of 1:1 was used in each Example.

Examples 12 to 17

Magnetic tape samples each were produced in the same manner as in Example 1 except that each lubricant composition obtained by mixing one of the compounds represented by the chemical formula (a1) to the chemical formula (a6) (corresponding to Examples 12 to 17) and the compound represented by the chemical formula (d1) (Fomblin-Z-DIAC™, Ausimont) in a molar ratio of 1:1 was used in each Example.

$$HOOCCF_2(OC_2F_4)_6OCF_2OCF_2COOH \quad (d1)$$

Examples 18 to 22

Magnetic tape samples each were produced in the same manner as in Example 1 except that each lubricant composition obtained by mixing one of the compounds represented by the chemical formula (b1) to the chemical formula (b5) (corresponding to Examples 18 to 22) and the compound represented by the chemical formula (d1) at a molar ratio of 1:1 was used in each Example.

Examples 23 to 28

Magnetic tape samples each were produced in the same manner as in Example 1 except that each lubricant composition obtained by mixing one of the compounds represented by the chemical formula (a1) to the chemical formula (a6) (corresponding to Examples 23 to 28) and the compound represented by the chemical formula (e1) in a molar ratio of 1:1 was used in each Example.

$$C_{17}H_{35}COOCH_2CF_2(OC_2F_4)_6OCF_2OCF_2CH_2OCOC_{17}H_{35} \quad (e1)$$

Examples 29 to 33

Magnetic tape samples each were produced in the same manner as in Example 1 except that each lubricant composition obtained by mixing one of the compounds represented by the chemical formula (b1) to the chemical formula (b5) (corresponding to Examples 29 to 33) and the compound represented by the chemical formula (e1) at a molar ratio of 1:1 was used in each Example.

Example 34

A magnetic tape sample was produced in the same manner as in Example 1 except that a lubricant composition obtained by mixing the compound represented by the chemical formula (a5) and the compound represented by the chemical formula (b1) in a molar ratio of 1:1 was used.

Example 35

A magnetic tape sample was produced in the same manner as in Example 1 except that a lubricant composition obtained by mixing the compound represented by the chemical formula (a5) and the compound represented by the chemical formula (b2) at a molar ratio of 1:1 was used.

Example 36

A magnetic tape sample was produced in the same manner as in Example 1 except that a lubricant composition obtained by mixing the compound represented by the chemical formula (a5) and the compound represented by the chemical formula (b4) in a molar ratio of 1:1 was used.

Example 37

A magnetic tape sample was produced in the same manner as in Example 1 except that a lubricant composition obtained by mixing the compound represented by the chemical formula (a5) and the compound represented by the chemical formula (a1) at a molar ratio of 1:1 was used.

Example 38

A magnetic tape sample was produced in the same manner as in Example 1 except that a lubricant composition obtained by mixing the compound represented by the chemical formula (a1) and the compound represented by the chemical formula (c1) at a molar ratio of 4:1 was used.

Example 39

A magnetic tape sample was produced in the same manner as in Example 1 except that a lubricant composition obtained by mixing the compound represented by the chemical formula (a1) and the compound represented by the chemical formula (c1) at a molar ratio of 1:4 was used.

Examples 40 to 48

Magnetic tape samples each were produced in the same manner as in Example 1 except that each lubricant composition of a three-component system obtained by mixing (at a molar ratio of 5:5:1) the compound represented by the chemical formula (a1), the compound represented by the chemical formula (c1), and one of the organic phosphorus-based compounds represented by the chemical formula (i1), (j1), (k1), (l1), (m1), (n1), (o1), (p1), and (q1) (corresponding to Examples 40 to 48) was used instead of the lubricant composition of a two-component system obtained by mixing (at a molar ratio of 1:1) the compound represented by the chemical formula (a1) and the compound represented by the chemical formula (c1).

$$HP(O)(OC_{12}H_{25})_2 \qquad (i1)$$

$$P(OC_{10}H_{21})_3 \qquad (j1)$$

$$P(SC_{12}H_{25})_3 \qquad (k1)$$

$$O=P(OC_{18}H_{37})_3 \qquad (l1)$$

$$S=P(OC_{18}H_{37})_3 \qquad (m1)$$

$$O=P(SC_{12}H_{25})_3 \qquad (n1)$$

$$S=P(SC_{18}H_{37})_3 \qquad (o1)$$

$$(C_{12}H_{25}O)_2P(O)OH \qquad (p1)$$

$$(C_{12}H_{25}O)P(O)(OH)_2 \qquad (q1)$$

Examples 49 to 52

Magnetic tape samples each were produced in the same manner as in Example 1 except that each lubricant composition of a three-component system obtained by mixing (at a molar ratio of 5:5:1) one of the compounds represented by the chemical formula (a1), (a6), (b1), and (b5) (corresponding to Examples 49 to 52), the compound represented by the chemical formula (d1), and the organic phosphorus-based compound represented by the chemical formula (i1) was used instead of the lubricant composition of a two-component system obtained by mixing (at a molar ratio of 1:1) the compound represented by the chemical formula (a1) and the compound represented by the chemical formula (c1).

Examples 53 to 56

Magnetic tape samples each were produced in the same manner as in Example 1 except that each lubricant composition of a three-component system obtained by mixing (at a molar ratio of 5:5:1) one of the compounds represented by the chemical formula (a1), (a6), (b1), and (b5) (corresponding to Examples 53 to 56), the compound represented by the chemical formula (e1), and the organic phosphorus-based compound represented by the chemical formula (i1) was used instead of the lubricant composition of a two-component system obtained by mixing (at a molar ratio of 1:1) the compound represented by the chemical formula (a1) and the compound represented by the chemical formula (c1).

Example 57

A magnetic tape sample was produced in the same manner as in Example 1 except that a lubricant composition of a three-component system obtained by mixing (at a molar ratio of 1:1:2) the compound represented by the chemical formula (a1), the compound represented by the chemical formula (c1), and the organic phosphorus-based compound represented by the chemical formula (i1) was used instead of the lubricant composition of a two-component system obtained by mixing (at a molar ratio of 1:1) the compound represented by the chemical formula (a1) and the compound represented by the chemical formula (c1).

Example 58

A magnetic tape sample was produced in the same manner as in Example 1 except that a lubricant composition of a three-component system obtained by mixing (at a molar ratio of 25:25:1) the compound represented by the chemical formula (a1), the compound represented by the chemical formula (c1), and the organic phosphorus-based compound represented by the chemical formula (i1) was used instead of the lubricant composition of a two-component system obtained by mixing (at a molar ratio of 1:1) the compound represented by the chemical formula (a1) and the compound represented by the chemical formula (c1).

Example 59

A magnetic tape sample was produced in the same manner as in Example 1 except that the step of forming the nitrogen-containing plasma polymerized film on the top surface portion of the carbon film (3) was omitted.

Example 60

A magnetic tape sample was produced in the same manner as in Example 1 except that the weight ratio of isopropyl alcohol and toluene in the organic solvent was changed from 1:1 to 8:1.

Example 61

A magnetic tape sample was produced in the same manner as in Example 1 except that the weight ratio of isopropyl alcohol and toluene in the organic solvent was changed from 1:1 to 1:8.

Comparative Example 1

A magnetic tape sample was produced in the same manner as in Example 1 except that the compound represented by the chemical formula (X), which is a known lubricant, was used alone instead of the lubricant composition of a two-component system obtained by mixing the compound represented by the chemical formula (a1) and the compound represented by the chemical formula (c1).

Comparative Example 2

A magnetic tape sample was produced in the same manner as in Example 1 except that the compound represented by the chemical formula (Y), which is a known lubricant, was used alone instead of the lubricant composition of a two-component system obtained by mixing the compound represented by the chemical formula (a1) and the compound represented by the chemical formula (c1).

Comparative Example 3

A magnetic tape sample was produced in the same manner as in Example 1 except that the compound represented by the chemical formula (a1) was used alone instead of the lubricant composition of a two-component system obtained by mixing the compound represented by the chemical formula (a1) and the compound represented by the chemical formula (c1).

Comparative Example 4

A magnetic tape sample was produced in the same manner as in Example 1 except that the compound represented by the chemical formula (c1) was used alone instead of the lubricant composition of a two-component system obtained by mixing the compound represented by the chemical formula (a1) and the compound represented by the chemical formula (c1).

Comparative Example 5

A magnetic tape sample was produced in the same manner as in Example 1 except that the compound represented by the chemical formula (i1) was used alone instead of the lubricant composition of a two-component system obtained by mixing the compound represented by the chemical formula (a1) and the compound represented by the chemical formula (c1).

Comparative Example 6

A magnetic tape sample was produced in the same manner as in Example 1 except that isopropyl alcohol was used alone instead of the mixed organic solvent composed of isopropyl alcohol and toluene.

Comparative Example 7

A magnetic tape sample was produced in the same manner as in Example 1 except that toluene was used alone instead of the mixed organic solvent composed of isopropyl alcohol and toluene.

With respect to each of the above-mentioned 8 mm-width magnetic tape samples obtained in Examples 1 to 61 and Comparative Examples 1 to 7, the following evaluation tests (1) and (2) were conducted. The results obtained by each test are shown in Table 1.

(1) Running durability test

With the use of a commercially available 8 mm VTR (EV-S900 made by Sony Corporation) modified for measurement of RF (radio frequency) outputs, each 8 mm-width tape sample was subjected to repeated reproduction for 300 passes for 300 hours under an environment of 5° C. and 80% RH for measurement of the RF output change. The change of the RF output after the test relative to that before the test is shown in decibel representation.

The tape damage was evaluated into five classes by observing the state of the tape sample by eye inspection and by means of a differential interference microscope. The evaluation standards are as follows.

5: No practical problems at all
4: Substantially no practical problems
3: Practicable but an improvement is desired.
2: Large tape damage with little practicability
1: Too much tape damage with no practicability at all (2) Still life test With the use of a commercially available 8 mm VTR (EV-S900 made by Sony Corporation) modified for measurement of still life, an initial still life was measured under an environment of 3° C. and 5% RH. The still life is represented by the period of time from the initial stage until the output dropped to 6 dB.

The still life after preservation was measured in the same manner as the measurement of the initial still life after the tape sample was left to stand for one month under an environment of 40° C. and 80% RH.

TABLE 1

|  | Running durability | | Still life | |
| --- | --- | --- | --- | --- |
|  | Output decrease (dB) | Tape damage | Initial Still life (min) | Still life after preservation (min) |
| Example 1 | −1.1 | 5 | >60 | 35 |
| Example 2 | −1.5 | 5 | >60 | 42 |
| Example 3 | −1.4 | 5 | >60 | 38 |
| Example 4 | −0.9 | 5 | >60 | 44 |

TABLE 1-continued

| | Running durability | | Still life | |
| --- | --- | --- | --- | --- |
| | Output decrease (dB) | Tape damage | Initial Still life (min) | Still life after preservation (min) |
| Example 5 | -0.8 | 5 | >60 | 39 |
| Example 6 | -1.3 | 4 | >60 | 44 |
| Example 7 | -1.4 | 5 | >60 | 35 |
| Example 8 | -1.0 | 5 | >60 | 43 |
| Example 9 | -1.2 | 5 | >60 | 41 |
| Example 10 | -1.4 | 5 | >60 | 42 |
| Example 11 | -0.8 | 4 | >60 | 46 |
| Example 12 | -0.9 | 5 | >60 | 44 |
| Example 13 | -1.3 | 5 | >60 | 45 |
| Example 14 | -1.4 | 5 | >60 | 41 |
| Example 15 | -1.1 | 5 | >60 | 39 |
| Example 16 | -1.2 | 5 | >60 | 35 |
| Example 17 | -1.3 | 4 | >60 | 41 |
| Example 18 | -0.8 | 5 | >60 | 43 |
| Example 19 | -1.4 | 5 | >60 | 40 |
| Example 20 | -1.2 | 5 | >60 | 42 |
| Example 21 | -1.3 | 5 | >60 | 39 |
| Example 22 | -1.1 | 4 | >60 | 43 |
| Example 23 | -1.3 | 5 | >60 | 55 |
| Example 24 | -1.2 | 5 | >60 | 52 |
| Example 25 | -1.1 | 5 | >60 | 49 |
| Example 26 | -1.2 | 5 | >60 | 47 |
| Example 27 | -1.3 | 4 | >60 | 52 |
| Example 28 | -0.8 | 5 | >60 | 48 |
| Example 29 | -1.0 | 5 | >60 | >60 |
| Example 30 | -1.2 | 5 | >60 | 44 |
| Example 31 | -1.3 | 5 | >60 | 49 |
| Example 32 | -1.1 | 4 | >60 | 55 |
| Example 33 | -0.9 | 5 | >60 | >60 |
| Example 34 | -1.1 | 5 | >60 | >60 |
| Example 35 | -1.4 | 5 | >60 | >60 |
| Example 36 | -1.3 | 5 | >60 | >60 |
| Example 37 | -0.9 | 5 | >60 | >60 |
| Example 38 | -1.0 | 5 | >60 | 44 |
| Example 39 | -1.2 | 5 | >60 | 47 |
| Example 40 | -0.8 | 5 | >60 | >60 |
| Example 41 | -1.4 | 5 | >60 | >60 |
| Example 42 | -1.3 | 5 | >60 | >60 |
| Example 43 | -1.2 | 5 | >60 | >60 |
| Example 44 | -1.5 | 5 | >60 | >60 |
| Example 45 | -0.9 | 5 | >60 | >60 |
| Example 46 | -0.8 | 5 | >60 | >60 |
| Example 47 | -1.1 | 5 | >60 | >60 |
| Example 48 | -1.4 | 5 | >60 | >60 |
| Example 49 | -1.3 | 5 | >60 | >60 |
| Example 50 | -1.5 | 4 | >60 | >60 |
| Example 51 | -1.4 | 5 | >60 | >60 |
| Example 52 | -1.2 | 4 | >60 | >60 |
| Example 53 | -0.8 | 5 | >60 | >60 |
| Example 54 | -0.9 | 5 | >60 | >60 |
| Example 55 | -0.9 | 5 | >60 | >60 |
| Example 56 | -0.7 | 5 | >60 | >60 |
| Example 57 | -1.9 | 4 | >60 | >60 |
| Example 58 | -0.5 | 5 | >60 | >60 |
| Example 59 | -2.2 | 4 | >60 | 32 |
| Example 60 | -1.7 | 5 | >60 | 51 |
| Example 61 | -1.8 | 5 | >60 | 56 |
| Comparative Example 1 | -6.6 | 1 | 8 | 1 |
| Comparative Example 2 | -7.8 | 1 | 6 | 1 |
| Comparative Example 3 | -2.1 | 5 | 19 | 3 |
| Comparative Example 4 | -2.4 | 4 | 25 | 9 |
| Comparative Example 5 | -4.1 | 2 | 33 | 5 |
| Comparative Example 6 | -2.9 | 3 | 31 | 6 |
| Comparative Example 7 | -3.5 | 3 | 44 | 7 |

As will be apparent from the above Table 1, in Examples 1 to 61, the decrease in the output was small with no generation of problems in tape damages, and further, the initial still life and the still life after the preservation were both good as compared with the Comparative Examples 1 to 7.

Thus, it is apparent that each of the magnetic tape samples of Examples 1 to 33, 38, 39, and 59 to 61, in which the lubricant layer (4) comprising at least one compound selected from a group consisting of the compounds represented by the general formulae (a) and (b) and at least one compound selected from the compounds represented by the general formulae (c), (d), and (e) is formed on the carbon film (3), is excellent in practical reliability such as running durability, still life, and others.

Further, it is apparent that each of the magnetic tape samples of Examples 34 to 36, in which the lubricant layer (4) comprising a lubricant composition obtained by mixing at least one compound selected from the compounds represented by the general formula (a) and at least one compound selected from the compounds represented by the general formula (b) is formed on the carbon film (3), is also excellent in practical reliability such as running durability, still life, and others.

Further, it is apparent that the magnetic tape sample of Example 37, in which the lubricant layer (4) comprising a lubricant composition obtained by mixing at least one compound selected from the compounds represented by the general formula (a) wherein $R_2$ is a perfluoroalkyl group and at least one compound selected from the compounds represented by the general formula (a) wherein $R_2$ is a perfluoropolyether group is formed on the carbon film (3), is also excellent in practical reliability such as running durability, still life, and others.

Further, each of the magnetic tape samples of Examples 40 to 58 comprising the lubricant composition which further comprises a mixed organic phosphorus-based compound, is likewise excellent in practical reliability such as running durability, still life, and others. As will be apparent from the fact that the still life after preservation is improved, those comprising the organic phosphorus-based compound show an improvement especially in still life. Further, although not particularly shown in Table 1, it was recognized that the magnetic tapes of Examples 40 to 58 each showed a great improvement in initial still life as compared with those that did not comprise an organic phosphorus-based compound.

In the magnetic tape of Example 59, the same lubricant composition as in Example 1 was used, but a nitrogen-containing plasma polymerized film was not formed on the carbon film (3). The running durability and the still life of Example 59 are a little inferior to that of Example 1. This shows that the nitrogen-containing plasma polymerized film contributes to improvements in the lubricating property of the magnetic tapes.

Further, the aforementioned magnetic tape samples of Examples 1 to 61 being excellent in terms of practical reliability such as running durability, still life, and the like can be stably produced by applying an application solution, which is prepared by dissolving the lubricant composition of the lubricant layer (4) into a mixed organic solvent of a hydrocarbon-based solvent and an alcohol-based solvent, onto the carbon film (3) to form the lubricant layer (4).

In Examples 1 to 61, the reverse roll coating method, which is a wet application method, was used in the step of forming the lubricant layer (4). However, a lubricant layer (4) having the same effect can be formed also by the vacuum vapor deposition method.

Here, in the above-described Examples 1 to 61, explanation is given on cases in which the magnetic recording medium of the present invention and the production method thereof are applied to a tape for commercially available 8 mm VTR tape. However, it goes without saying that the magnetic recording medium of the present invention and the production method thereof are not limited to these alone and can be applied also to other metal thin film type magnetic tapes, magnetic disks, and the like.

Industrial Applicability

The lubricant composition of the present invention comprises a combination of two or more kinds of specific fluorine-containing compounds. All of the lubricant compositions of the present invention exhibit an excellent lubricating property and are particularly suited for forming a lubricant layer of a magnetic recording medium.

The magnetic recording medium of the present invention comprises the lubricant composition of the present invention having an excellent lubricating property in the lubricating layer. By a synergistic effect of these, the magnetic recording medium of the present invention is excellent in running durability and still durability, and the electromagnetic conversion properties thereof are not deteriorated, i.e. the decrease in the output is small, even if it is allowed to run for a long period of time. Therefore, it has a high practical value and is extremely useful in the field of magnetic recording.

In addition, by using a lubricant composition further comprising an organic phosphorus-based compound and/or by forming a nitrogen-containing plasma polymerized film on a carbon film, the adhesion strength of the lubricant layer to the carbon film in the magnetic recording medium is further improved, and a magnetic recording medium having a more excellent lubricating property is obtained. Further, by a synergistic effect of these, the magnetic recording medium of the present invention shows an improvement in practical reliability such as running durability, still durability, and the like without deteriorating the electromagnetic conversion characteristics.

The magnetic recording medium of the present invention is produced by a production method including the step of applying an application solution, which is prepared by dissolving the composition of the lubricant layer into a specific solvent, on a carbon film. With the use of this application solution, a lubricant layer having a uniform thickness without unevenness of application is obtained. In other words, the production method of the present invention makes it possible to stably produce a magnetic recording medium of the present invention which is excellent in practical reliability such as running durability and still life.

What is claimed is:

1. A lubricant composition comprising
at least one compound having a perfluoroalkyl group or a perfluoropolyether group, and an alkyl group or an alkenyl group in a molecule, which compound is selected from a group consisting of compounds represented by the following general formulae (a) and (b):

wherein $R_1$ is an alkyl group or an alkenyl group, $R_2$ is a perfluoroalkyl group or a perfluoropolyether group, "a" is an integer of 0 to 20, and "b" is 0 or 1; and wherein $R_3$ is an alkyl group or an alkenyl group, $R_4$ is a perfluoroalkyl group or a perfluoropolyether group, $R_5$ is O or S, "c" is an integer of 0 to 20, and "d" is 0 or 1; and at least one compound having a perfluoropolyether group in a molecule, which compound is selected from a group consisting of compounds represented by the following general formulae (c), (d) and (e):

$$HOCH_2CF_2(OC_2F_4)_e(OCF_2)_gOCF_2CH_2OH \quad (c)$$

wherein "e" and "g" each are integers of not less than 1;

$$HOOCCF_2(OC_2F_4)_i(OCF_2)_jOCF_2COOH \quad (d)$$

wherein "i" and "j" each are integers of not less than 1; and $$R_6COOCH_2CF_2(OC_2F_4)_k(OCF_2)_pOCF_2CH_2OCOR_6 \quad (e)$$

wherein "k" and "p" each are integers of not less than 1, and $R_6$ is an alkyl group having 4 to 22 carbon atoms.

2. The lubricant composition according to claim 1 in which the perfluoropolyether group is selected from a group consisting of groups represented by the following general formulae (f), (g) and (h):

wherein "q" is an integer of not less than 1;

wherein "r" and "t" are each integer of not less than 1; and wherein $R_7$ is a perfluoroalkyl group, "u" is an integer of 1 to 6, and "v" is an integer of 1 to 30.

3. The lubricant composition according to claim 1 which comprises further an organic phosphorus-based compound.

4. The lubricant composition according to claim 3 in which the organic phosphorus-based compound is selected from the group consisting of compounds represented by the following general formulae (i), (j), (k), (l), (m), (n), (o), (p), and (q):

$$HP(O)(OC_nH_{2n+1})_2 \quad (i)$$
$$P(OC_nH_{2n+1})_3 \quad (j)$$
$$P(SC_nH_{2n+1})_3 \quad (k)$$
$$O=P(OC_nH_{2n+1})_3 \quad (l)$$
$$S=P(OC_nH_{2n+1})_3 \quad (m)$$
$$O=P(SC_nH_{2n+1})_3 \quad (n)$$
$$S=P(SC_nH_{2n+1})_3 \quad (o)$$
$$(C_nH_{2n+1}O)_2P(O)OH \quad (p)$$
$$(C_nH_{2n+1}O)P(O)(OH)_2 \quad (q)$$

wherein each "n" is an integer of 8 to 20.

5. The lubricant composition according to claim 1 which is used for a magnetic recording medium.

6. A magnetic recording medium having a ferromagnetic metal thin film, a carbon film, and a lubricant layer formed in this order on a non-magnetic substrate, wherein the lubricant layer comprises the lubricant composition according to claim 1.

7. The magnetic recording medium according to claim 6 in which the carbon film has a nitrogen-containing plasma polymerized film on a top surface portion thereof and the lubricant layer is formed on the nitrogen-containing plasma polymerized film of the carbon film.

8. A method of producing the magnetic recording medium according to claim 6 or 7 wherein the step of forming the lubricant layer comprises the step of applying an application solution, which is prepared by dissolving the lubricant composition into a mixed organic solvent of a hydrocarbon-based solvent and an alcohol-based solvent, on the carbon film.

9. The method according to claim 8 wherein the mixing ratio of the hydrocarbon-based solvent and the alcohol-based solvent is within the range of 1:9 to 9:1 by weight.

* * * * *